US005183527A

United States Patent [19]

Parker

[11] Patent Number: 5,183,527

[45] Date of Patent: Feb. 2, 1993

[54] PERIMETER PRESSURE SEAL MODULE

[75] Inventor: Rebecca L. Parker, Grand Island, N.Y.

[73] Assignee: Moore Business Forms, Inc., Grand Island, N.Y.

[21] Appl. No.: 684,273

[22] Filed: Apr. 12, 1991

[51] Int. Cl.[5] .......... B32B 31/04

[52] U.S. Cl. .......... 156/555; 156/580; 425/371

[58] Field of Search .......... 156/555, 583.1, 583.5, 156/583.91, 553, 580; 100/93 RP; 425/371

[56] References Cited

U.S. PATENT DOCUMENTS

| | | | |
|---|---|---|---|
| 426,728 | 0/1890 | Maret . | |
| 891,701 | 6/1908 | Jennings . | |
| 2,190,413 | 2/1940 | Davidson | 271/49 |
| 2,234,223 | 3/1941 | Ball | 26/63 |
| 2,746,221 | 5/1956 | Rouan et al. | 53/31 |
| 2,893,468 | 7/1959 | Fieroh | 154/42 |
| 3,006,257 | 10/1961 | Orsini | 93/35 |
| 3,068,933 | 12/1962 | Klar | 156/367 |
| 3,449,196 | 6/1969 | Yumoto et al. | 156/498 |
| 3,527,632 | 9/1970 | Holes et al. | 156/216 |
| 3,540,970 | 11/1970 | Huntwork | 156/556 |
| 3,727,908 | 4/1973 | Whitesell et al. | 270/53 |
| 3,765,990 | 10/1973 | Histed et al. | 156/582 X |
| 3,953,272 | 4/1976 | Webber | 156/152 |
| 4,033,807 | 7/1977 | Neill et al. | 156/384 |
| 4,325,773 | 4/1982 | Shulz | 156/471 |
| 4,350,555 | 9/1982 | Popoff | 156/540 |
| 4,426,035 | 1/1984 | Dieckow | 206/526 |
| 4,461,661 | 7/1984 | Fabel | 156/70 |
| 4,540,458 | 9/1985 | Baughman et al. | 156/312 |
| 4,557,377 | 12/1985 | Maloney | 206/219 |
| 4,721,501 | 1/1988 | Herrington | 156/583.1 X |
| 4,721,502 | 1/1988 | Herrington | 493/193 |
| 4,768,411 | 9/1988 | Su | 493/10 |
| 4,826,475 | 5/1989 | Eweryd | 493/10 |
| 4,861,414 | 8/1989 | Vogan | 156/530 |
| 4,919,738 | 4/1990 | Ball et al. | 156/73.5 |
| 5,080,751 | 1/1992 | DeWan | 156/579 |

*Primary Examiner*—David A. Simmons
*Assistant Examiner*—J. Sells
*Attorney, Agent, or Firm*—Nixon & Vanderhye

[57] ABSTRACT

A portable perimeter pressure sealer for sealing pressure sensitive adhesive strips along perimeter edges of a business form includes two pair of sealer wheels, the upper wheel of each pair being angularly movable relative to the lower wheel of each pair to insure uniform application of sealing pressure to a form passing therebetween. The upper wheels have peripheral pressure sealing surfaces which are biased into non-parallel relationship when no form is present between the respective sealer wheel pairs, but which are forced into a parallel relationship upon introduction of a form between the nips of the respective roll pairs.

39 Claims, 7 Drawing Sheets

PERIMETER PRESSURE SEAL MODULE

BACKGROUND AND SUMMARY OF THE INVENTION

This invention relates to a portable perimeter pressure sealer module for repairing and/or sealing business forms utilizing pressure sensitive adhesive strips.

In commonly assigned, copending patent application Ser. Nos. 07/417,775 filed Oct. 31, 1990, 07/647,984 filed Jan. 30, 1991, 07/656,439) filed Feb. 19, 1991 there are disclosed methods and apparatus for perimeter pressure sealing of business forms which utilize pressure sensitive adhesives about their perimeters (usually in relatively thin strip form) rather than, for example, heat activated adhesives. The methods and apparatus disclosed in those patent applications, while effective for a wide variety of applications, are nevertheless too complex for certain other applications where low cost, portable units are more desirable. These other applications may include repair of individual forms or even original sealing of small numbers of forms.

In commonly assigned copending patent application Ser. No. 07/605,797, filed Oct. 31, 1990, there is disclosed a table-top pressure sealer designed to handle business forms on a manual feed or semi-manual feed basis. As described in that application, first and second feed rollers convey business forms through the sealer and are driven by a single motor-driven gear which meshes with additional gears integrally formed on the rollers. Pressure applying rollers are mounted above and in alignment with the first and second rollers, and are biased by an adjustable spring mechanism which provides the necessary pressure to affect activation of the pressure sensitive adhesive. The spring mechanism is arranged generally vertically so as to create compression forces perpendicular to the rotational axes of the pressure rollers.

It will be appreciated, however, that where peripheral pressure surfaces of cooperating rollers are biased into engagement with their respective rotational axes parallel, there will necessarily be a slight tilting of one or the other of the axes (and hence one or the other of the peripheral pressure surfaces) of the pressure rollers, thereby causing non-uniform application of pressure on the adhesive strip located between two (or more) form parts.

In the present invention, a portable perimeter pressure seal module for repair or low cost sealing of business forms utilizing pressure sensitive adhesive along one or more perimetral edges is provided wherein the mechanism for applying compressive force between cooperating upper and lower pressure sealer wheels is oriented in a direction generally parallel to the rotational axes of the sealer wheels. At the same time, the sealer Wheels are mounted so that when their rotational axes are parallel, there is a slight gap (less than the thickness of the form) between their respective peripheral sealing surfaces.

This arrangement causes the peripheral sealing surface of one sealer wheel in each of a pair of sealer wheels to assume a non-parallel orientation with respect to the peripheral sealing surface of the cooperating sealer wheel prior to the introduction of a form between the wheels. Upon such introduction, however, the upper sealer wheel (in the exemplary embodiment) is resiliently biased to a substantially parallel orientation vis-a-vis the peripheral sealing surface of the cooperating lower sealer wheel. As a result, uniform sealing pressure is applied to the pressure sensitive adhesive strip as the business form passes through the sealer module.

The above described arrangement is made possible through the utilization of a unique frame structure which mounts the sealer wheels as described in greater detail hereinbelow.

In accordance with one exemplary embodiment of the invention, the perimeter pressure sealer module frame assembly includes a front frame and a rear support frame held in spaced parallel relation by a plurality of tie bars. The tie bars extend between lower portions of the front and rear frames to maintain a substantially rigid connection therebetween. The front frame also has an upper portion which is connected to the lower portion by a pair of vertically arranged planar spring hinge inserts extending between the upper and lower portions. At the same time, the upper portion of the front frame is connected to the upper portion of the rear frame by a pair of horizontally arranged springs which permit controlled flexing of the upper portion of the front frame relative to both the lower portion of the front frame and to the rear frame. It will be understood that references herein to "vertical" and/or "horizontal" are merely intended to facilitate an understanding of the exemplary embodiment of the invention in one orientation relative to, for example, a supporting surface such as a table top.

The frame assembly rotatably mounts two pair of cooperating sealer wheels, one pair located downstream from the other pair in a direction of movement of the form through the sealer module. The upper sealer wheels of each pair are mounted to the upper portion of the front frame, while the lower sealer wheels of each pair are mounted to the lower portion of the front frame. It will thus be appreciated that the upper sealer wheels of each pair are movable relative to the respective lower sealer wheels by reason of the flexible mounting arrangement of the upper portion of the front frame.

More specifically, the pair of springs extending horizontally between the upper portion of the front frame and the rear frame exert a force on the upper portion of the front frame in a direction generally parallel to the axes of rotation of the sealer wheels. Because of the flexible connection between the upper and lower portions of the front frame, however, the applied force tends to pivot the upper portion of the front frame and the upper sealer wheels about the vertical spring hinge inserts and away from the rear frame, so that the peripheral sealing surfaces of the upper sealer wheels are biased to a non-parallel orientation with respect to peripheral sealing surfaces of the lower sealer wheels.

When a business form is introduced between the sealer wheel pairs of the module, the upper sealer wheels, along with the upper portion of the front frame, are forced to pivot back toward the rear frame against the biasing force exerted by the horizontal springs extending between the upper portion of the front frame and the rear frame, so that the peripheral sealing surfaces of the upper sealer wheels now extend substantially parallel to the peripheral sealing surfaces of the lower sealer wheels. This insures uniform application of pressure along the pressure sensitive adhesive strip in the business form passing between the sealer wheels.

In this exemplary embodiment, one of the lower sealer wheels is driven directly by a motor and the other of the lower sealer wheels is driven by means of a pair of pulleys mounted on the sealer wheel axes and a belt extending therebetween. It is also a feature of this invention that the pulley for the downstream sealer wheel has a slightly smaller diameter than the pulley for the upstream sealer wheel so that the downstream sealer wheel feeds faster to thereby prevent wrinkling of the form upon hitting the nip of the downstream sealer wheel pair.

In one exemplary embodiment, there may be provided a pair of O-rings, one extending around the upper sealer wheels and the other extending around the lower sealer wheels. These rings, mounted in peripheral grooves adjacent the peripheral pressure surfaces of the sealer wheels, serve to hold the form and carry it from the first to the second of the sealer wheel pairs. This is particularly critical for any business form which is shorter than the spacing between the sealer wheel pairs.

It is another feature of the invention to provide a platform that supports the form and on which the form can rest as it passes between the sealer wheels. When such platform is utilized, the lower of the two above described O-rings may be omitted.

The sealer module can be used as a stand-alone unit for repair sealing or for manually sealing the perimeter adhesive strips of a form. Alternatively, two or more modules can be combined and configured into various styles of low cost perimeter sealers simply by coupling mirrored units with shafts connecting the sealer wheels of laterally spaced units. This arrangement permits laterally spaced adhesive strips of a form to be activated simultaneously. For a typical form, two passes through the device will seal all four edges.

Thus, in accordance with one exemplary embodiment of the invention, there is provided a pressure sealer for activating a pressure sensitive adhesive strip between a pair of form parts comprising a first frame; at least a first pair of cooperating sealer wheels having first and second peripheral sealing surfaces, respectively, the sealer wheels rotatably mounted in the first frame; and means for causing one of the first and second peripheral sealing surfaces to assume a non-parallel orientation with respect to the other of the first and second peripheral sealing surfaces when no form parts are present between the sealer wheels.

The above described arrangement provides a low cost, effective sealer module for specific, non-sophisticated applications in the business form and related industries.

Other objects and advantages of the invention will become apparent from the detailed description which follows.

DETAILED DESCRIPTION OF THE DRAWINGS

Figure 1:
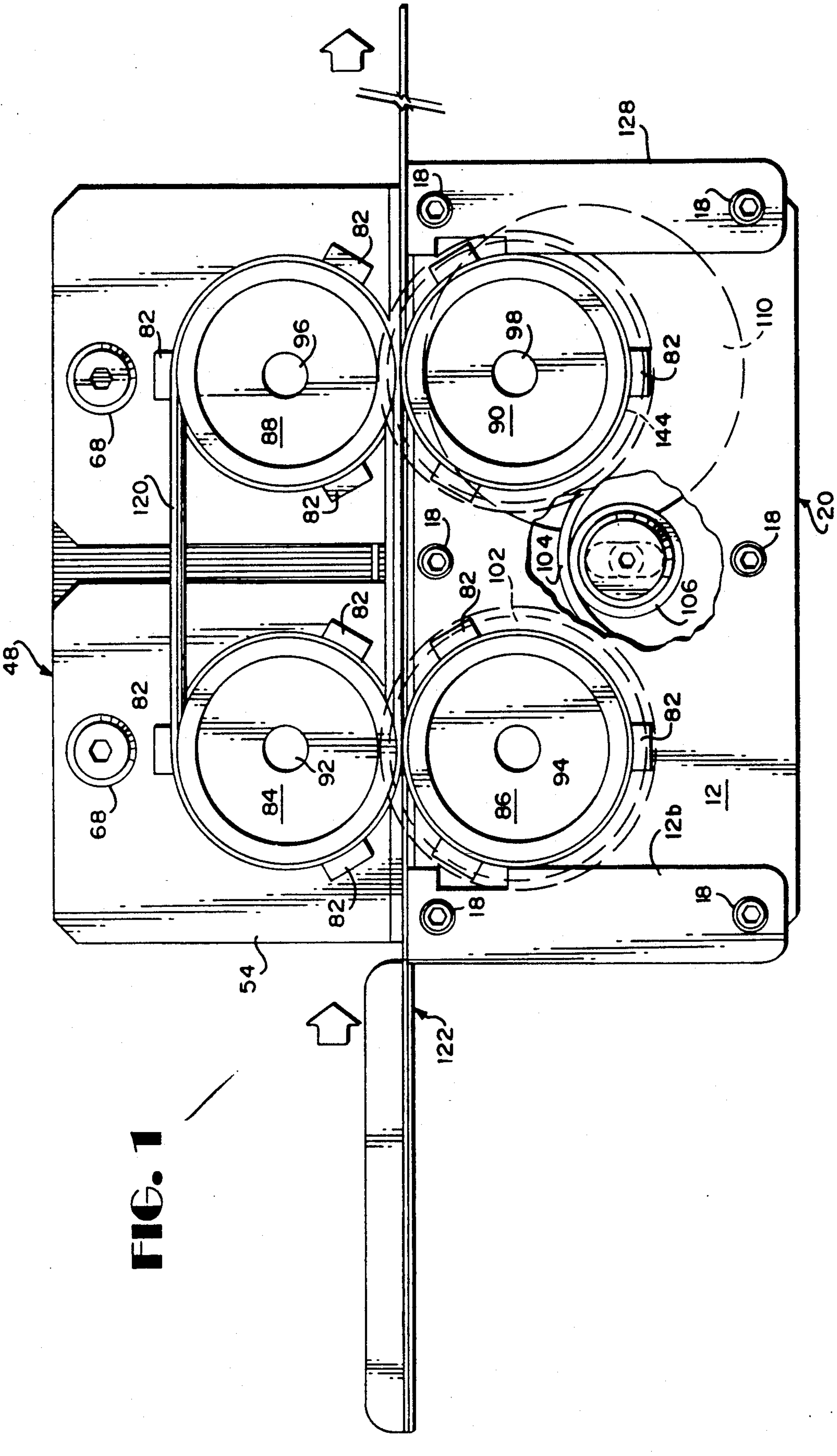
FIG. 1 is a front elevation of a portable pressure sealer module in accordance with an exemplary embodiment of the invention.
Figure 2:
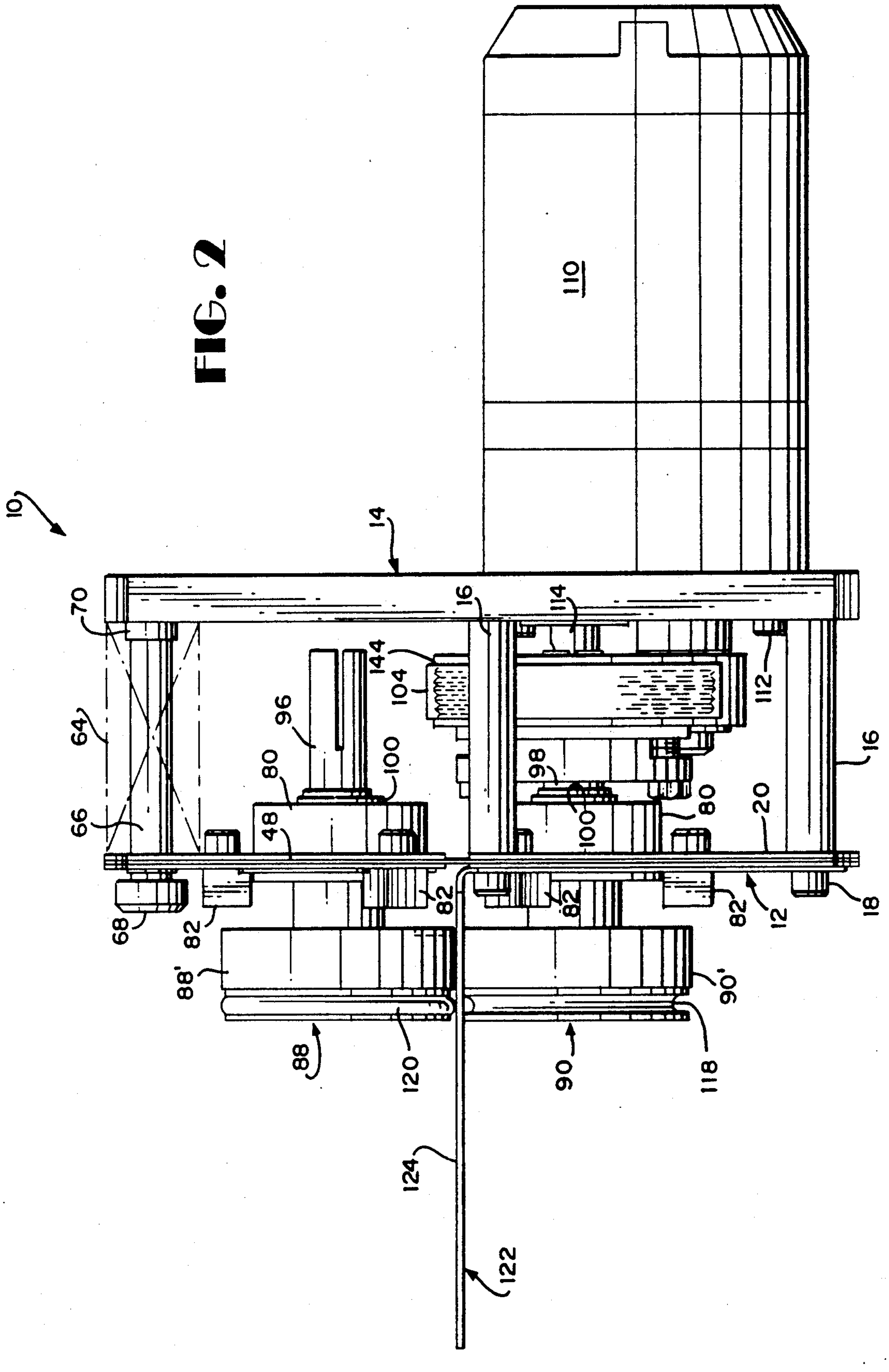
FIG. 2 is a side elevation of the module shown in FIG. 1.

With reference to FIGS. 1 and 2, the perimeter pressure sealer module 10 generally includes a front frame 12 and a rear support frame 14. The rear frame 14 is held in spaced, parallel relation to the front frame 12 by a plurality of tie bars 16 and associated screws 18, extending between a lower portion 20 of the front frame 12 and the rear frame 14.

Figure 3:
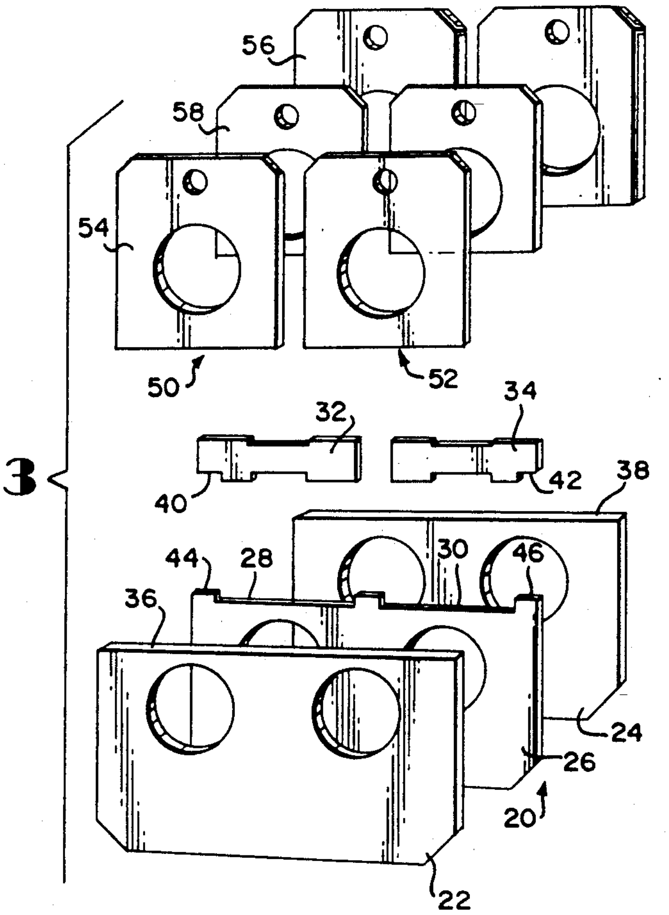
FIG. 3 is a an exploded view of the front frame component of the module shown in FIG. 1.
Figure 4:
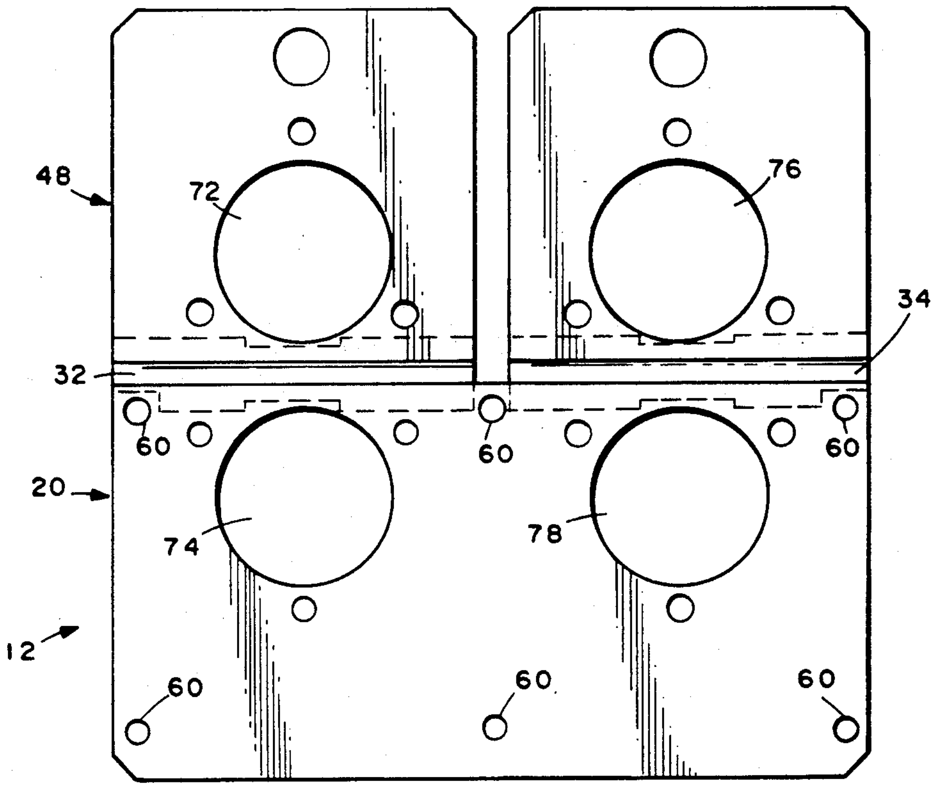
FIG. 4 is a front view of the front frame component of the module shown in FIG. 1.
Figure 6:
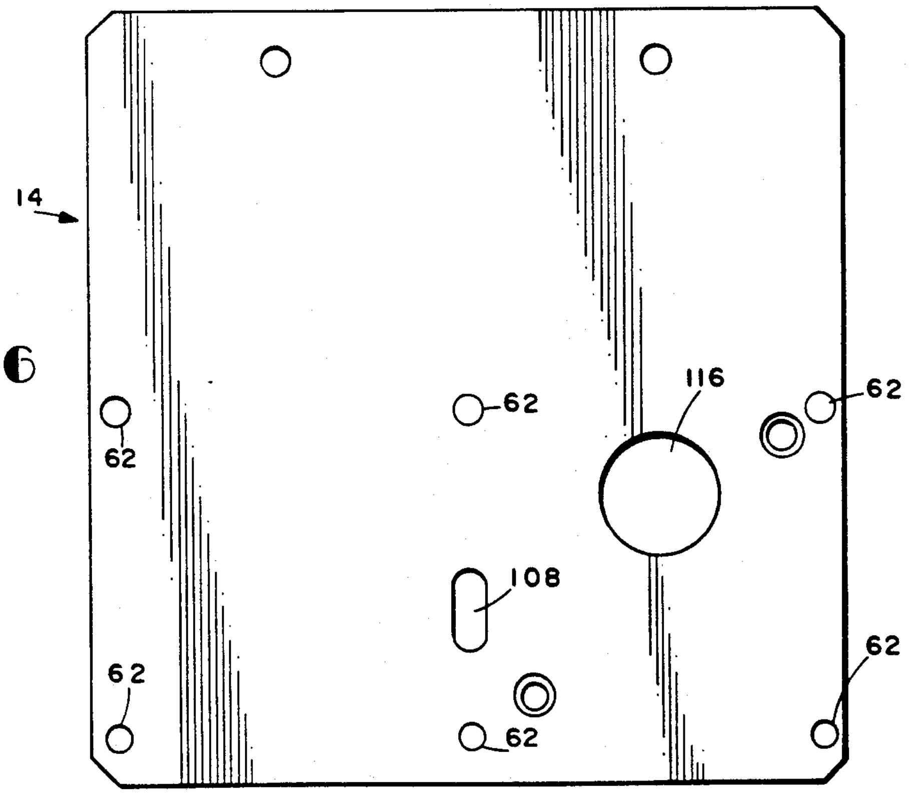
FIG. 6 is a front view of the rear support frame component of the module shown in FIG. 1.
Figure 7:
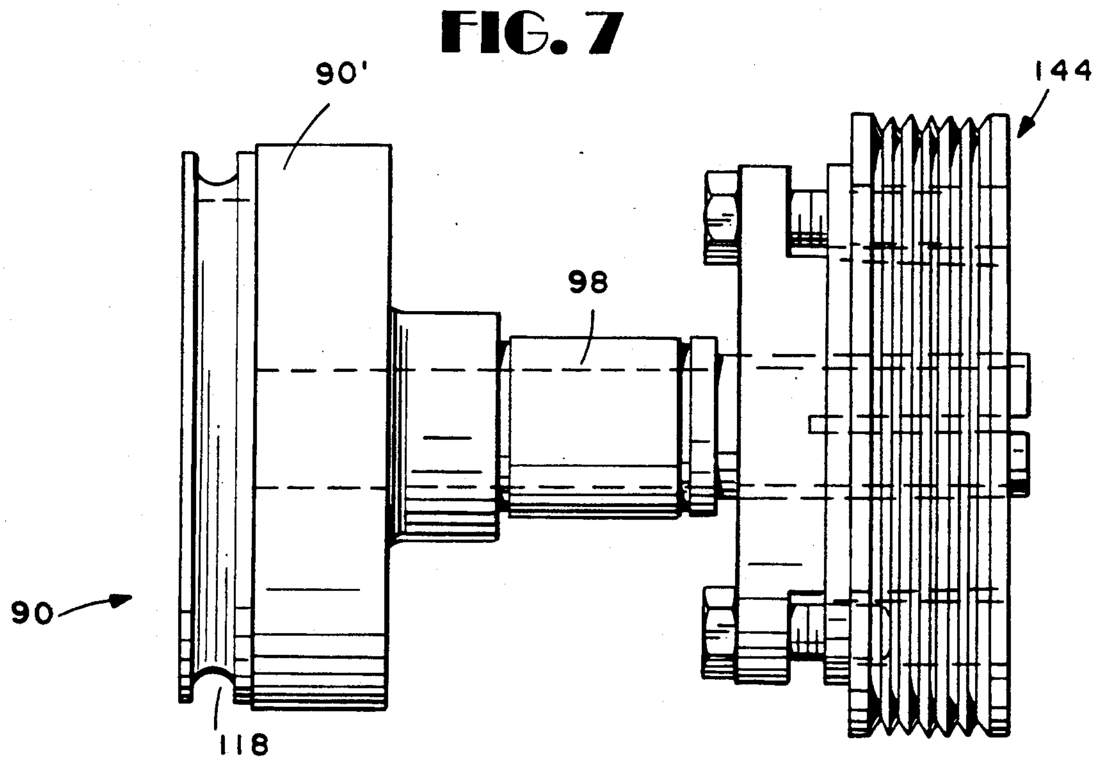
FIG. 7 is a side view of a pressure sealer wheel and associated pulley in accordance with an exemplary embodiment of the invention.

The front frame 12, more clearly seen in FIGS. 3 and 4, is a laminate structure where the lower portion 20 is formed by outer plates 22, 24 sandwiched about an intermediate spacer plate 26. These plates may be spot-welded or otherwise rigidly secured to each other.

Spacer plate 26 is formed with upper recessed portions 28, 30 adapted to partially receive a pair of frame spring hinges 32, 34 in substantially planar, side-by-side relationship, with upper portions (more than half) of the springs projecting above edges 36, 38 of plates 22, 24, respectively. More specifically, end notches 40, 42 of springs 32, 34, respectively, are adapted to rest on projections 44, 46 at opposite ends of the spacer plate 26 as best seen in FIG. 4.

Figure 5:
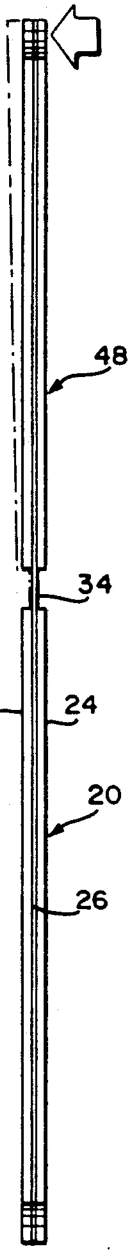
FIG. 5 is a side view of the front frame component shown in FIG. 1.

An upper portion 48 of the front frame 12 is comprised of two identical assembles 50, 52, only one of which need be described in detail. With reference to FIG. 3, assembly 50 includes a pair of upper frame pieces 54, 56 sandwiched about an upper frame spacer 58. As in the lower frame portion construction elements 54, 56 and 58 may be spot-welded or otherwise rigidly secured. The upper frame spacer 58 is sized to permit the exposed portions of springs 32, 34 to extend upwardly into a space defined by the upper frame pieces 54, 56 and the spacer 58. As best seen in FIGS. 4 and 5, upon assembly, the lower front frame portion 20 is vertically spaced from the upper front frame portion 48 but nevertheless connected thereto by the springs 32, 34, middle portions of which remain exposed as best seen in FIGS. 2, 4 and 5 to thereby permit the upper frame portion 48 to flex relative to the lower frame portion 20 about the springs 32, 34 which form a resilient hinge therebetween.

The front frame 12 is also provided in its lower portion 20 with a plurality (six shown) of apertures 60, and rear frame 14 is provided with a plurality of apertures 62 aligned with apertures 60 and adapted to receive the screws 18 for connecting the front and rear frame components via a corresponding number of tie bars 16.

The upper front frame portion 48 and the rear frame 14 are connected by a pair of identical springs 64, which extend between the frames and which are telescoped over a respective pair of shoulder screws 66. These springs may be Lamina Die Springs which are helical coil springs made from rectangularly shaped wire, but other suitable biasing means may be employed. Heads 68 of the screws 66 are spaced from the front frame 12 by spacers 70. As a result of this frame construction, it will be appreciated that the upper portion 48 of the front frame can be flexed toward and away from the rear support frame 14 about spring hinges 32, 34 and against the resilient biasing action of the springs 64.

The lower portion 20 and upper portion 48 of the front frame 12 are also provided with horizontally and vertically aligned pairs of circular apertures 72, 74, 76 and 78 (see FIG. 4), each of which receives a double row bearing 80 (see FIG. 2) held in place on the front side of the module by three clips 82 (per wheel). Bearings 80 may be MRC Model 5204-CZZG or other suitable bearings. Rotatable sealer wheel pairs 84, 86 and 88, 90 have at least partially hollow axle shafts 92, 94, 96 and 98 which extend through the bearings, with free ends thereof terminating short of the rear support frame 14. The wheel pairs are retained within the bearings, by means of retaining rings 100 (shown in FIG. 2) which are received over the axle shafts 92, 94, 96 and 98 on the rear side of respective bearings 80.

The free ends of the lower axle shafts 94 and 98 slidably receive pulleys 102, and 144, respectively, with associated bushings. Pulley 102 may be a Browning Poly-V Pulley, Model 6J30H or other suitable pulley. Pulley 144 may be initially identical to pulley 102, modified to be slightly smaller in diameter. The aligned pulleys are connected by a Poly-V belt 104, best seen in FIG. 1. A conventional, adjustable tensioning idler wheel 106 may be secured to the rear frame 14 to permit tension adjustment in the belt 104 via vertical adjustment of wheel 106 within a vertically oriented slot 108 in the rear frame 14.

A motor 110 is secured to the back side of rear frame 14 by means of screws 112. The output shaft 114 of the motor extends through an opening 116 on the rear frame 14, through the pulley 144 and into the hollow portion of axle 98 of sealer wheel 90. The shaft 114 and corresponding hollow portion of axle 98 are provided with cross sectional shapes (such as square) which cause sealer wheel 90, along with pulley 144 to rotate with the motor output shaft 114. This can also be effected by the squeezing action of the pulley 144 and associated bushing clamping the hollow portion of axle 98 to the motor shaft 114 as the bushing is tightened, as in this exemplary embodiment. The motor 110 in an exemplary arrangement is a Bodine Gearmotor, Model #473, although it will be understood that other motors may be employed as well.

It will be appreciated, then, that the motor 110 serves to drive the lower sealer wheels 86 and 90 to rotate by means of the belt 104 extending between pulleys 102 and 144.

As indicated previously, the diameter of pulley 144 associated with sealer wheel 90 is preferably slightly smaller than that of pulley 102 associated with sealer wheel 86. This will cause wheel 90 to rotate at a slightly greater speed than wheel 86 to thereby prevent wrinkling of a form as it passes into the nip between cooperating downstream wheels 88, 90.

The two pairs of sealer wheels 84, 86 and 88, 90 are mounted and sized to create a 0.006 inch gap between the respective peripheral pressure surfaces (two of which, 88', 90' are shown in FIG. 2) when installed and setting free (unloaded). This gap dimension is determined experimentally to produce a fairly even pressure across the wheel nip when a form of predetermined thickness, greater than the gap thickness, is introduced between the sealer wheels of the module 10. Above each upper sealer wheel, there is a spring 64 compressed between the front and rear support frames. These springs supply the loading for the sealer wheels by forcing the upper section of the frame to pivot forward about the spring steel hinge, thereby causing the upper wheel to contact the lower wheel and exert pressure on it.

Figure 5A:
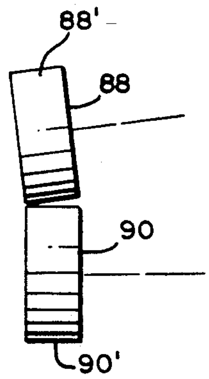
FIG. 5*a* is a partial detail showing the orientation of cooperable pressure sealer wheels in a non-operative position.
Figure 5B:
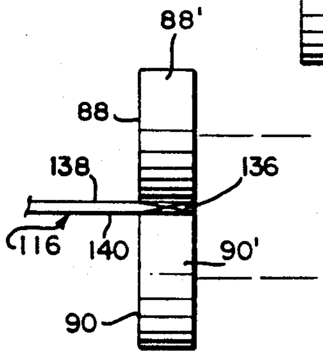
FIG. 5*b* is a partial detail as shown in FIG. 5*a* but with a form inserted between the pressure sealer wheels.

When no form is present between the sealer wheels of either pair, the peripheral sealing surfaces will assume a non-parallel orientation as shown schematically in FIG. 5*a*, using wheels 88, 90 as an example. Upon introduction of a form 116 between the sealer wheels 88, 90, the upper sealer wheel 88 will be forced to pivot rearwardly, along with the upper portion 48 of the front frame 12, so that the smooth peripheral pressure sealing surfaces 88', 90' will assume a substantially parallel orientation as shown in FIG. 5*b*. Of course, this same action will take place with respect to sealer wheels 84, 86 as well. Since the gap between the sealer wheels (with no form between the wheels and with the rotational axes of the wheels held parallel) is less than the thickness of the form, pressure will be applied to the form sufficient to activate the pressure sensitive adhesive strip between the parts of the form.

Figure 8:
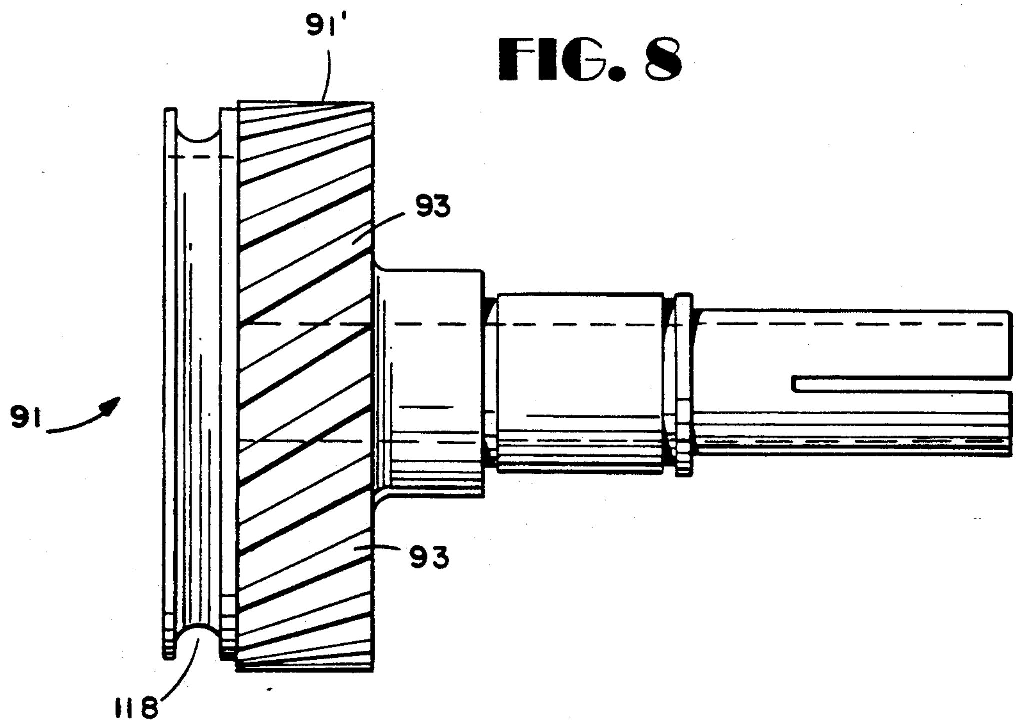
FIG. 8 is a side view of a pressure sealer wheel in accordance with another exemplary embodiment of the invention.

With reference to FIG. 8, an alternative sealer wheel 91 is illustrated which is provided with a patterned sealing surface 91' in the form of helical gear teeth 93. The wheel is otherwise identical to sealer wheels 84, 86, 88 and 90. In an alternative embodiment, patterned wheels such as 91 may be substituted for lower wheels 86, 90 so as to cause the pressure sensitive adhesive to be activated in an interrupted, regular pattern so that any small feed errors in one or both form parts are taken up in the areas between the teeth 93. Further details of such patterned sealer wheels and the manner in which they are used to effect perimeter pressure sealing in business forms may be found in commonly assigned co-pending application Ser. No. 07/647,984 filed Jan. 30, 1991, the entirety of which is incorporated herein by reference.

Each of the sealer wheels 84, 86, 88 and 90 is also provided with an identical annular groove 118 extending about its periphery adjacent the pressure sealing surface and on the side of the wheel remote from the frame. An O-ring 120 extends about the two upper sealer wheels 84, 88 while another (see FIG. 11) may extend about the lower sealer wheels 86, 90. Whether one or two O-rings are employed will depend on whether a form supporting platform is used with the module, as described further below.

Figure 9:
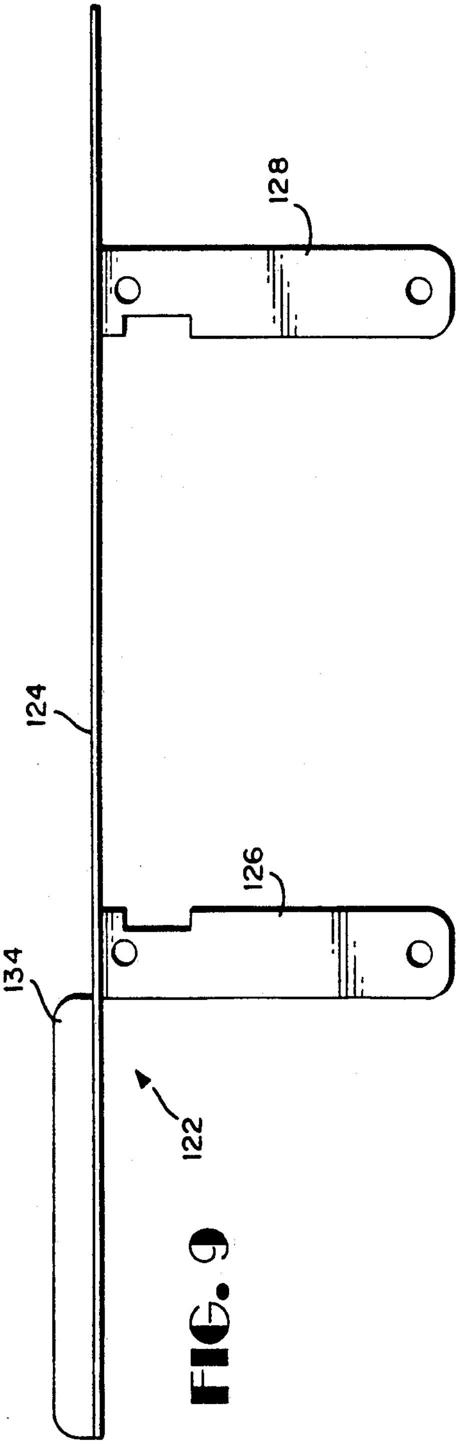
FIG. 9 is a front view of a support platform as shown in FIGS. 1 and 2, but removed from the module.
Figure 10:
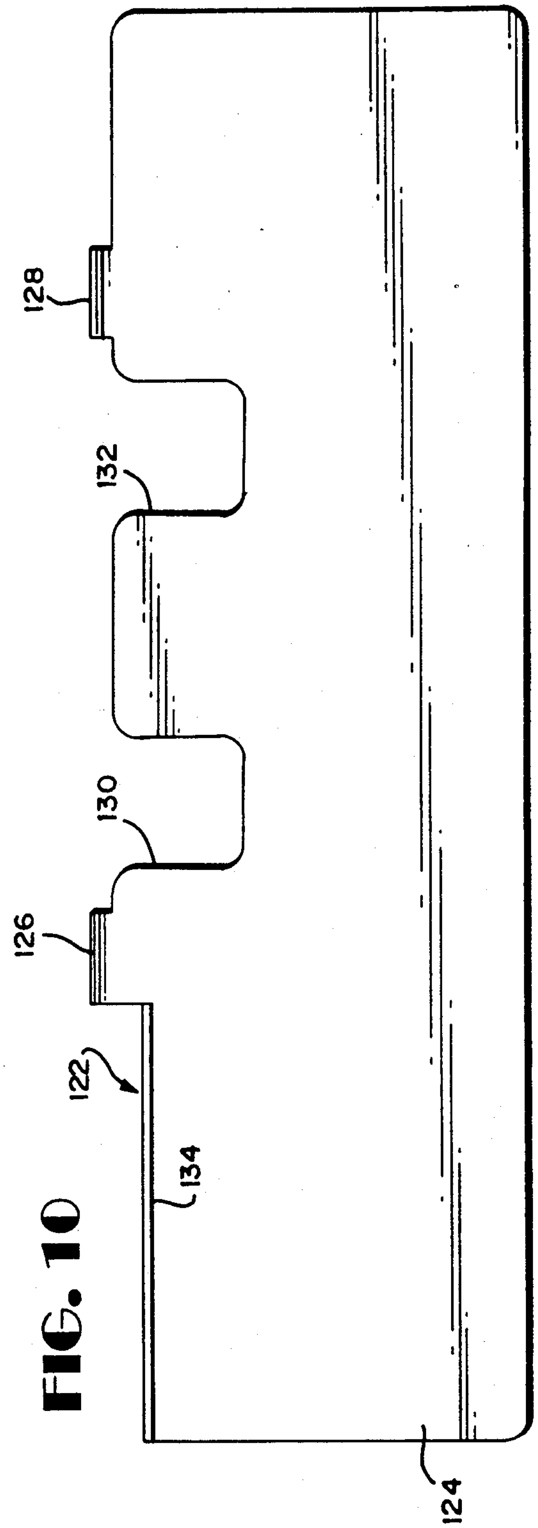
FIG. 10 is a top view of the platform shown in FIG. 9.

With reference now to FIGS. 1, 2 and 9, a support platform 122 may be utilized with the module 10 to facilitate guiding and feeding of individual business forms through the module. The platform 122 includes a horizontal, planar support surface 124 and a pair of downwardly extending mounting flanges 126, 128 which are located to align with the holes 60 at either end of the bottom portion 20 of front frame 12. This enables the platform to be secured with the same screws as are used to fasten the lower portion 20 to the rear frame 14 as described previously, and as best seen in FIGS. 1 and 2.

The platform 122 is provided with notches 130, 132 which are vertically aligned with the axes of the respective pairs of sealer wheels so as to not interfere with the application of pressure to the form as it passes from one pair of sealer wheels to the next. As best seen in FIG. 2, the platform 122 is precisely located at the nips of the respective sealer wheel pairs so that the form remains horizontally planar as it travels through the module 10. A vertical guide flange 134 is provided at the entry end of the module to properly align one edge of the form so that the adhesive strip adjacent that edge will be aligned with the sealer wheels.

It will be appreciated that upon introduction of the form into the nip between the first pair of sealer wheels 84, 86, the form will be fed forward not only by the rotation of wheels 84, 86 but also by the engagement of O-ring 120 with the form, the latter being sandwiched between the O-ring and the support surface 124. With this arrangement, there is no need for a second O-ring between wheels 86 and 90.

Figure 11:
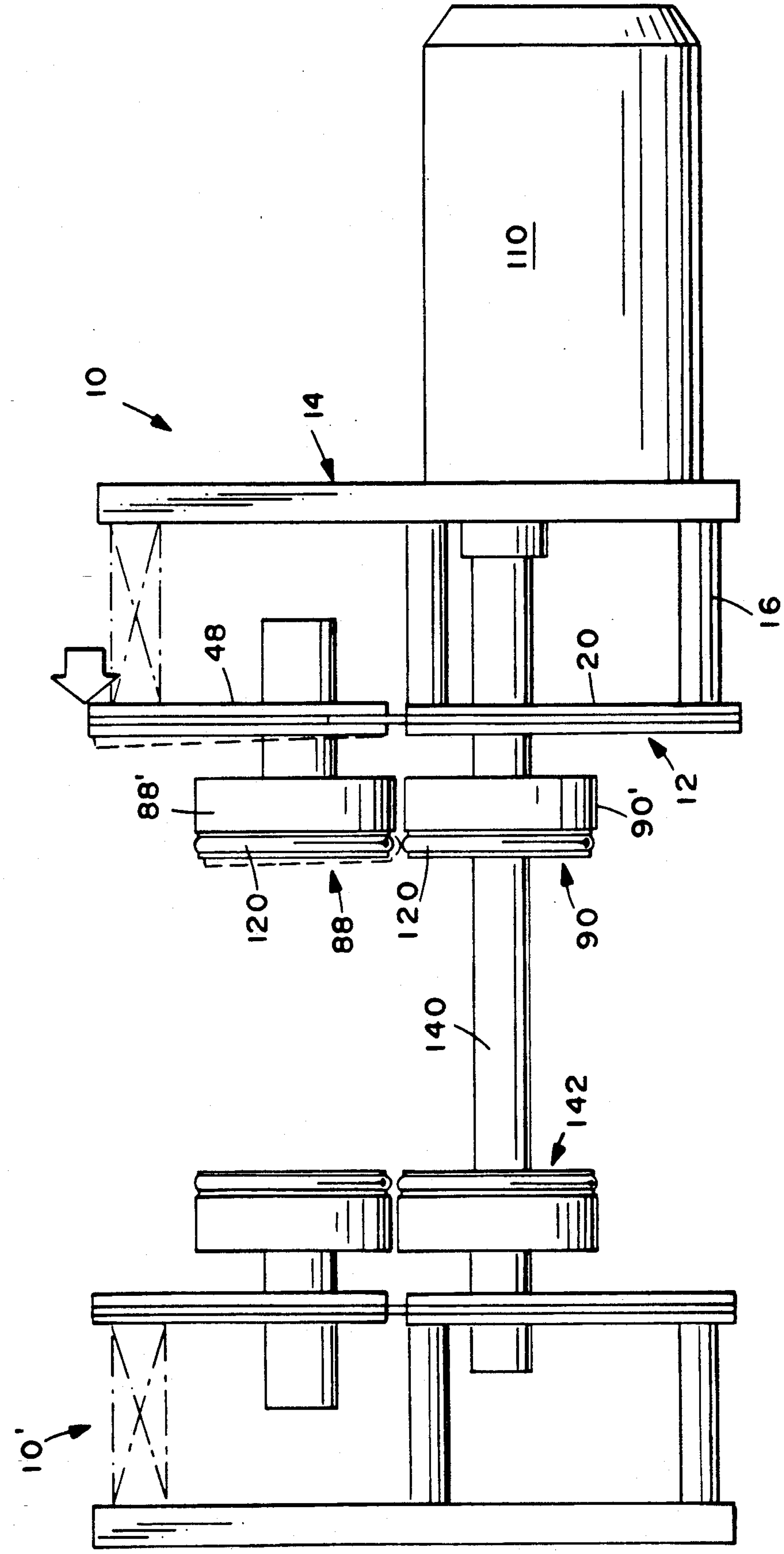
FIG. 11 is a side view of a pair of modules of the type shown in FIG. 1, joined together in accordance with another embodiment of the invention.

In the event, however, that the support platform is not utilized, then a second O-ring 120 would be utilized to facilitate the movement of the form. An arrangement of this type is shown in FIG. 11 but is not limited to use in that particular embodiment which is described further hereinbelow.

The use of a single O-ring 120 in conjunction with platform 122, or a pair of O-rings 120 in the event the platform is not used, is particularly important for forms which have a length which is less than the space between the respective pairs of sealer wheels 84, 86 and 88, 90. In such cases, the additional feed capability is required to insure that the form will enter the nip of the downstream pair of wheels 88, 90.

In use, when a form 116 is fed into the sealer module 10, it will first enter the nip between wheels 84, 86 and force the wheels apart so that they are substantially parallel to each other (FIG. 5*b*) and therefore exert the desired uniform pressure on the adhesive strip 136 located between upper and lower parts 138, 140 of the form.

The form will continue through the second pair of sealer wheels 88, 90 where additional pressure is applied to insure activation of the pressure sensitive adhesive strip 136.

It will be appreciated that the above described sealer module 10 can be utilized as a stand-alone unit for repair sealing, or for originally sealing one strip along one side of a form (a business envelope for example). Where a form contains more than one pressure sensitive strip, reorienting the form relative to the module will permit sequential activation thereof.

Referring to FIG. 11, a pair of modules 10, 10' can be combined to permit simultaneous activation of pressure sensitive adhesive strips along spaced parallel edges of a form. This can be accomplished fairly easily by coupling mirrored units with a drive shaft 140 extending from motor 110 through the sealer wheel 90 to a lower sealer wheel 142 of the adjacent module 10'.

The sealer module 10', with the exception of the omission of motor 110 and the switching of the pulleys 102 and 144 from axles 94 and 98 to axles 98 and 94, respectively (the drive pulleys 102 and 144 are omitted from both module 10 and 10' for clarity in FIG. 11) is otherwise identical to module 10 and need not be further described.

Other combinations and configurations of individual sealer modules are contemplated for use with various styles of forms, and thus, the above described embodiments are exemplary only.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure sealer for activating a pressure sensitive adhesive strip between at least a pair of form parts comprising:

a first frame;

at least a first pair of cooperating sealer wheels having first and second peripheral sealing surfaces, respectively, said sealer wheels rotatably mounted in said first frame;

means for causing one of the first and second peripheral sealing surfaces to assume a non-parallel orientation with respect to the other of the first and second peripheral sealing surfaces when no form parts are present between the sealer wheels, and for causing the first and second peripheral sealing surfaces to assume a substantially parallel orientation when the form parts are introduced between the sealer wheels, said means exerting compressive force between said first and second peripheral sealing surfaces sufficient to activate the pressure sensitive adhesive strip when the form parts are introduced between the sealer wheels.

2. The pressure sealer of claim 1 wherein said first frame includes upper and lower portions, one of said pair of sealer wheels mounted in the upper frame portion, and the other of said pair of sealer wheels mounted in the lower frame portion, said means including a flexible connection between said upper and lower frame portions.

3. The pressure sealer of claim 2 and further including a second frame spaced from and substantially parallel to said first frame, said lower portion of said first frame being rigidly secured to said second frame, and wherein said means further includes a resilient connection between the upper portion of said first frame and said second frame.

4. The pressure sealer of claim 3 wherein said resilient connection includes at least one spring extending between the upper portion of the first frame and the second frame to exert said compressive force between said first and second peripheral sealing surfaces.

5. The pressure sealer of claim 2 and including a motor for directly driving the other of said pair of sealer wheels.

6. The pressure sealer of claim 1 wherein when said first and second peripheral sealing surfaces are in the substantially parallel orientation, there is a gap of about 0.006 inch therebetween.

7. The pressure sealer of claim 1 and further including a second pair of cooperating sealer wheels downstream of said first sealer wheels, and having third and fourth peripheral sealing surfaces, said second pair of wheels also rotatably mounted in said first frame; said means also causing one of the third and fourth peripheral sealing surfaces to assume a non-parallel orientation with respect to the other of the third and fourth peripheral sealing surface when no form parts are present between the second pair of sealer wheels.

8. The pressure sealer of claim 7 wherein said means further causes the third and fourth peripheral sealing surfaces to assume a substantially parallel orientation when the form parts are introduced between the second pair of sealer wheels.

9. The pressure sealer of claim 8 wherein said first frame includes upper and lower portions, and wherein said one of each said first and second pair of sealer wheels are mounted in the upper frame portion and said other of each said first and second pair of sealer wheels are mounted in the lower frame portion, said means including a flexible connection between the upper and lower frame portions.

10. The pressure sealer of claim 9 wherein said flexible connection comprises a pair of planar springs.

11. The pressure sealer of claim 9 and further including a second frame spaced from and substantially parallel to said first frame, said lower portion of said first frame being rigidly secured to said second frame, and wherein said means includes a resilient connection between the upper portion of the first frame and the second frame.

12. The pressure sealer of claim 11 wherein said resilient connection includes at least one spring extending between the upper portion of the first frame and the second frame.

13. The pressure sealer of claim 11 wherein said resilient connection includes a pair of springs extending between the upper portion of the first frame and the second frame.

14. The pressure sealer of claim 13 wherein one of said pair of springs exerts said compressive forces between said first and second peripheral sealing surfaces and the other of said pair of springs exerts compressive forces between said third and fourth peripheral sealing surfaces, respectively, said forces sufficient to activate the pressure sensitive adhesive strip when the form parts pass between the first and second pair of sealer wheels.

15. The pressure sealer of claim 8 wherein when said first and second, and third and fourth pressure sealing surfaces, respectively, are in the substantially parallel orientation, there are gaps of about 0.006 inch therebetween.

16. The pressure sealer of claim 9 and including a motor for driving the other of sealer wheels.

17. The pressure sealer of claim 16 wherein said motor includes an output shaft operatively connected to the other of the first pair of sealer wheels, said sealer further including pulleys mounted on axles of the other of said first and second pair of sealer wheels, with a drive belt extending between the pulleys.

18. The pressure sealer of claim 7 and including flexible feeder means extending between the first and second pair of sealer wheels.

19. The pressure sealer of claim 9 wherein flexible feeder means extend between at least said one of said first and second pair of sealer wheels.

20. The pressure sealer of claim 19 wherein said flexible web feeder means includes a first O-ring belt extending between said one of said first and second sealer wheels and a second O-ring belt extending between the other of said first and second pair of sealer wheels.

21. The pressure sealer of claim 19 and further including a planar web supporting platform extending to one side of said first frame and away from said second frame.

22. A modular pressure sealer for activating at least one pressure sensitive adhesive strip between two or more form parts comprising;

a front frame having upper and lower portions;

a rear frame extending substantially parallel and spaced from said front frame, wherein said lower portion of said front frame is rigidly secured to said rear frame and said upper portion of said front frame is movable relative to both said lower portion of said front frame and to said rear frame;

two pair of sealer wheels, each pair including an upper sealer wheel mounted on the upper portion of the front frame and a lower sealer wheel mounted on the lower portion of the front frame, said upper and lower sealer wheels of each pair having vertically aligned peripheral sealing surfaces for engaging opposite sides of the form parts, wherein one sealer wheel of each pair of sealer wheels is biased toward the other sealer wheel of each pair of sealer wheels to thereby exert compressive forces on the form parts sufficient to activate the adhesive strip between said form parts.

23. The pressure sealer of claim 22 wherein each sealer wheel has an axis of rotation, said one each sealer wheel of said pair of sealer wheels being adjustable to move their respective axes of rotation between non-parallel and parallel orientations relative to the axes of rotation of the other wheels of said pair of sealer wheels as a function of feeding the form parts between said two pair of sealer wheels.

24. The pressure sealer of claim 23 wherein said axis of rotation of said one sealer wheel of each pair is normally biased to said non-parallel orientation, and is adapted to move to said parallel orientation when the form parts are introduced between said first and second peripheral sealing surfaces.

25. The pressure sealer of claim 22 wherein said two pair of sealer wheels extend from a side of said front frame remote from said rear frame.

26. The pressure sealer of claim 22 wherein said upper portion of said front frame is flexibly secured to said lower portion of said front frame.

27. The pressure sealer of claim 22 and including a motor for driving the lower sealer wheel of each of said two pair of sealer wheels.

28. The pressure sealer of claim 24 wherein, in said parallel orientation, there is a gap of about 0.006 inch between the sealer wheels of each of said two pair of sealer wheels.

29. The pressure sealer of claim 22 wherein flexible web feeder means extend between at least said one of said first and second pair of sealer wheels.

30. The pressure sealer of claim 22 wherein said flexible web feeder means includes a first O-ring belt extending between said one of said first and second sealer wheels and a second O-ring belt extending between the other of said first and second pair of sealer wheels.

31. The pressure sealer of claim 22 and further including a planar web supporting platform extending to one side of said first frame and away from said second frame.

32. A pressure sealer for activating a pressure sensitive adhesive strip between at least a pair of form parts comprising:

a first frame having upper and lower portions and a flexible connection therebetween;

a second frame spaced from and substantially parallel to said first frame, said lower portion of said first frame being rigidly secured to said second frame, and said upper portion of said first frame being resiliently connected to said second frame;

a first pair of cooperating sealer wheels having first and second peripheral sealing surfaces, respectively, said sealer wheels rotatably mounted in said first frame, one of said first pair of sealer wheels mounted in the upper portion of said first frame, and the other of said pair of sealer wheels mounted in the lower portion of said frame; and means causing said first and second peripheral sealing surfaces to assume a substantially parallel orientation when the form parts are introduced between the sealer wheels.

33. The pressure sealer of claim 32 said upper portion of said first frame is resiliently connected to said second frame by at least one spring.

34. The pressure sealer of claim 33 wherein said at least one spring exerts compressive force between said first and second peripheral sealing surfaces sufficient to activate the pressure sensitive adhesive strip when the form parts are introduced between the sealer wheels.

35. The pressure sealer of claim 32 and including a motor for directly driving the other of said first pair of sealer wheels.

36. The pressure sealer of claim 32 wherein when said first and second peripheral sealing surfaces are in the substantially parallel orientation, there is a gap of about 0.006 inch therebetween.

37. The pressure sealer of claim 32 and further including a second pair of cooperating sealer wheels downstream of said first pair of sealer wheels, and having third and fourth peripheral sealing surfaces, said second pair of wheels also rotatably mounted in said first frame.

38. The pressure sealer of claim 37 wherein said means further causes the third and fourth peripheral sealing surface to assume a substantially parallel orientation when the form parts are introduced between the second pair of sealer wheels.

39. A modular pressure sealer for activating at least one pressure sensitive adhesive strip between two or more form parts comprising;

a front frame having upper and lower portions;

a rear frame extending substantially parallel and spaced from said front frame;

two pair of sealer wheels, each pair including an upper sealer wheel mounted on the upper portion of the front frame and a lower sealer wheel mounted on the lower portion of the front frame, said upper and lower sealer wheels of each pair having vertically aligned peripheral sealing surfaces for engaging opposite sides of the form parts, wherein one sealer wheel of each pair of sealer wheels is biased toward the other sealer wheel of each pair of sealer wheels to thereby exert compressive forces on the form parts sufficient to activate the adhesive strip between said form parts, and wherein first spring means are provided between said upper and lower portions of said front frame, and second spring means are provided between said upper portion of said front frame and said rear frame.

* * * * *